July 26, 1938.  W. H. PRATT  2,125,124
LOAD LOSS METER
Filed Sept. 9, 1937
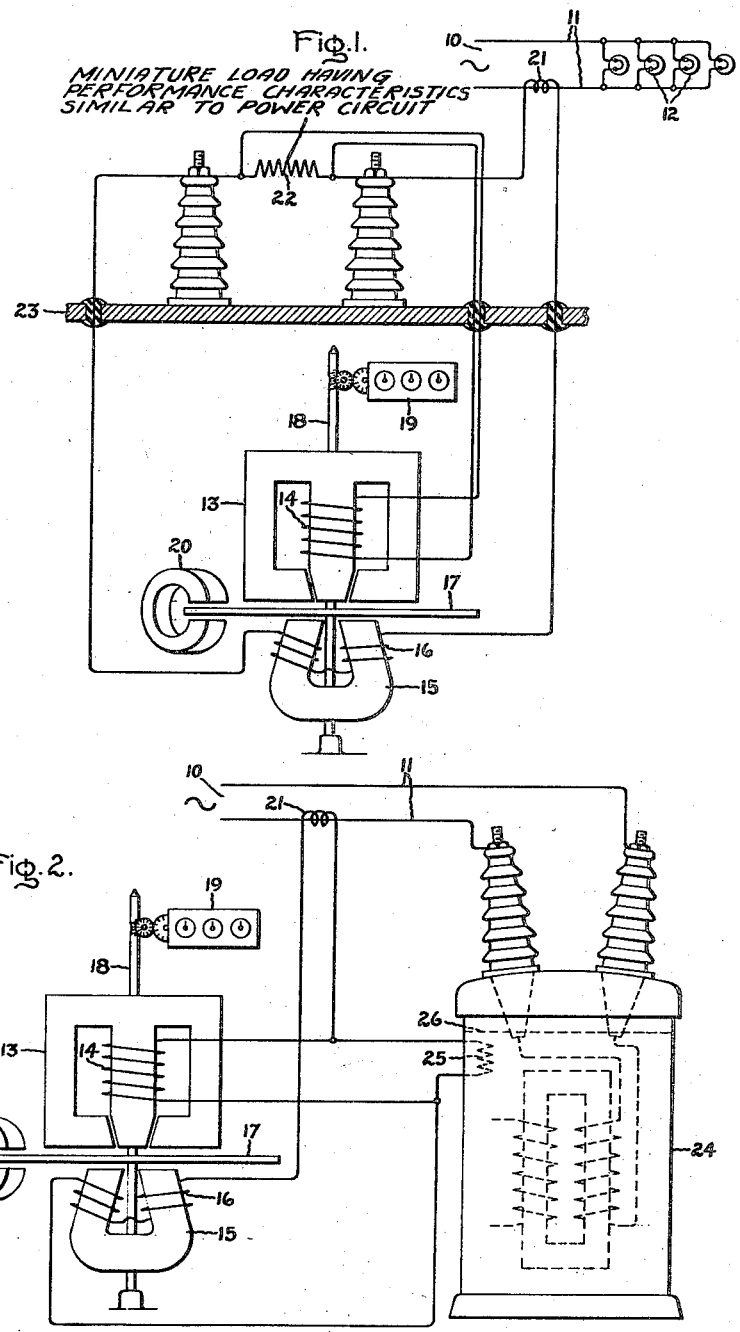
Inventor:
William H. Pratt,
by Harry E. Dunham
His Attorney.

Patented July 26, 1938

2,125,124

UNITED STATES PATENT OFFICE 2,125,124

LOAD LOSS METER

William H. Pratt, Lynn, Mass., assignor to General Electric Company, a corporation of New York Application September 9, 1937, Serial No. 163,102

3 Claims. (Cl. 175—183)

My invention relates to meters for directly measuring electrical losses in power circuits such as in transmission lines, transformers, etc., in a simple manner and without the necessity of correcting the meter reading for temperature variations to which the load may be subjected or multiplying the meter reading by a factor representative of the resistance of the circuit.

Ampere-squared-hour meters have heretofore been used to obtain a very approximate measurement of the losses of electrical circuits. In using such meters the practice has been to multiply the reading of the meter by a factor that represents to some degree of approximation the resistance of the circuit to which the meter is connected and of which the loss measurement is required. The resistance factor of the circuit varies considerably depending upon its temperature coefficient of resistance and temperature variations and the latter is affected by sunshine, rain, wind, amount of current carried, etc. At best such measurements involve calculations and unless a very good record is kept of the various factors which alter the operating temperature of the circuit at all times and these factors are properly balanced the final calculated loss is not likely to be very accurate.

According to the present invention I provide what may be considered a miniature circuit having temperature coefficient and thermal characteristics like that of the main circuit the losses in which are desired and which is subjected to the same climatic and heating current conditions as the main circuit and measure the actual losses in such miniature circuit which then when multiplied by a constant factor, which may be incorporated in the register gear ratio of the loss meter, gives a close approximation of the main circuit losses without calculation or necessity of interpretation for changes in temperature, etc.

The features of my invention which are believed to be novel and patentable will be pointed out in the claims appended hereto. For a better understanding of my invention reference is made in the following description to the accompanying drawing which illustrates in Fig. 1 my invention as applied for measuring the losses in a transmission line circuit and in Fig. 2 as applied to measuring the losses of a power transformer circuit.

Referring to Fig. 1, 10 represents a source of supply for a transmission line 11 to which a load 12 is connected. This transmission line may be several miles in length. The meter shown for measuring the losses of transmission line 11 is in structure like a low voltage induction watt-hour meter having an E-shaped core 13 provided with an energizing winding 14 on its middle leg and a U-shaped core 15 provided with an energizing winding 16. The fluxes of these electromagnets cooperate to produce rotation of a conducting armature disc 17 by induction. The meter shaft is indicated at 18 and the register at 19. 20 is a permanent magnet for providing the necessary damping. Other details of the meter are not indicated as the meter itself is not the invention. Any type of meter which will produce a measurement proportional to the product of the currents flowing in the two energizing circuits indicated may be used. One of the energizing windings 16 is energized by a current which is proportional to the line current of transmission line 11 and for this purpose this winding is energized by the current transformer 21. 22 indicates an impedance device, which in this case may be a resistance, which has a temperature coefficient of resistance like that of the transmission line. If the transmission line is made of copper the impedance 22 will be made of copper of the same grade. The impedance 22 is, moreover, placed out of doors and is exposed to sunshine, rain, sleet, wind, etc., so far as practicable in the same way that the transmission line 11 will be exposed to the outdoor conditions affecting its operating temperature in order that the impedance will be maintained at the same temperature as the line 11. The impedance 22 may be suitably supported above the roof of the station in which the loss meter is located or on one of the adjacent transmission line towers for line 11. In any event reasonable care should be taken so that the temperature and the temperature changing effect of climatic conditions will be substantially the same on both transmission line 11 and impedance 22. In the illustration, 23 may designate the roof of a building above which the impedance 22 is supported. The impedance 22 is, moreover, subjected to a current which is at all times proportional to the current in the transmission line by connecting the impedance in series with the secondary of current transformer 21 and in series with the current winding 16 of the loss meter. The impedance 22 has such a resistance that when traversed by the secondary current of transformer 21 it will have an operating temperature the same as the temperature of transmission line 11 when traversed by its proportionate line current and subjected to the same atmospheric temperature conditions. For example, if the prevailing ambient atmospheric temperature of line 11 and impedance 22 is 50 degrees F. and the current in line 11 is such as to raise its temperature to 54 degrees under the cooling effect of any breeze that may exist, the current in impedance 22 will be such as to raise its temperature to 54 degrees under the same cooling effect of such breeze. With reasonable care then impedance 22 and line 11 will always operate at, or very close to, the same temperature and the loss in impedance 22 will always be a definite fraction of the loss in line 11. The coil 14 of the loss meter is connected across the impedance 22 and is, therefore, traversed by a current proportional to the drop across such impedance and the meter will then measure the loss in such impedance which is a definite fraction of the loss in transmission line 11. The meter may then be calibrated to register directly the losses of line 11. In a case where the transmission line is very long or traverses appreciably different elevations and is thus likely to have sections operating at different temperatures it may be desirable to provide similar loss meters at the different sections and average their readings in arriving at the total line loss.

It will be understood that the impedance 22 is the predominating impedance of its circuit and that the impedance of meter winding 16 is negligible so that the voltage drop across the impedance 22 multiplied by the current flowing therein is a true measure of the loss in impedance 22.

In Fig. 2 I have represented the invention as applied to obtain the losses in the circuit of a power transformer indicated at 24. The current transformer 21 is preferably connected in the primary line to the transformer so that the loss measurement will include the loss due to the flow of the transformer exciting current. The miniature load represented by the impedance 25 is placed within the transformer tank just below the level 26 of the cooling medium therein or otherwise so as to be subjected to the same average temperature as prevails in the transformer windings. The impedance 25 has the same temperature coefficient of resistance as that of the transformer windings and is otherwise designed to have the same heating and cooling characteristics and to operate at the same temperature as that at which the transformer operates with varying load. In other respects the installation of Fig. 2 is similar to that of Fig. 1 and the same measurement principles apply.

What I claim as new and desire to secure by Letters Patent of the United States is:

1. Apparatus for measuring electrical losses in electric power circuits comprising in combination with a power circuit, an impedance supplied with current proportional to the current in the power circuit, said impedance having a temperature coefficient of resistance like that of the power circuit and having substantially similar heating and cooling characteristics to that of the power circuit when the circuit and impedance are subjected to their respective proportionate currents and provisions whereby the impedance is maintained at substantially the same operating temperature as the operating temperature of the power circuit, and a meter having a current winding traversed by the current in said impedance and a winding traversed by a current proportional to the voltage drop in said impedance for obtaining a measurement of the product of the currents in said windings.

2. Apparatus for measuring the electrical loss in an electric power circuit comprising in combination with such circuit, a miniature electrical load, means supplied from said power circuit for circulating a current in the minature load which is at all times proportional to the current in the power circuit, said miniature load having an effective temperature coefficient of resistance substantially the same as that of the power circuit and having such resistance as to be heated to the same temperature as that of the power circuit when both are traversed by their respective proportional currents, provisions whereby the miniature load is subjected to substantially the same ambient temperature as that to which the power circuit is subjected whereby their operating temperatures are maintained the same and vary the same, if they vary, a meter for measuring the losses in the miniature load, said meter having a winding traversed by a current proportional to the current in said miniature load and a winding traversed by a current proportional to the voltage across said miniature load and an armature driven by induction at a speed proportional to the product of said currents and a register for said meter registering the rotations of said armature in terms of the loss in said power circuit.

3. Apparatus for measuring electrical losses in transformers comprising in combination a transformer having a primary winding, an inclosing casing and a cooling medium in said casing in which the primary winding is immersed, an impedance having a temperature coefficient of resistance like that of the primary winding, said impedance being immersed in said cooling medium so as to be exposed to substantially the same temperature as said winding, a supply circuit to said primary winding, a current transformer between said supply circuit and said impedance for the purpose of conveying a heating current to said impedance which is proportional to the current supplied to said primary winding, and an induction power meter having two windings which are energized by currents which are proportional to the current through said impedance and the voltage across the impedance.

WILLIAM H. PRATT.